(12) United States Patent
Kim et al.

(10) Patent No.: US 9,374,819 B2
(45) Date of Patent: Jun. 21, 2016

(54) METHOD AND DEVICE FOR RECEIVING CONTROL INFORMATION IN WIRELESS COMMUNICATION SYSTEM

(71) Applicant: LG ELECTRONICS INC., Seoul (KR)

(72) Inventors: Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 130 days.

(21) Appl. No.: 14/348,661

(22) PCT Filed: Oct. 15, 2012

(86) PCT No.: PCT/KR2012/008406
§ 371 (c)(1),
(2) Date: Mar. 31, 2014

(87) PCT Pub. No.: WO2013/055193
PCT Pub. Date: Apr. 18, 2013

(65) Prior Publication Data
US 2014/0247816 A1    Sep. 4, 2014

Related U.S. Application Data

(60) Provisional application No. 61/547,016, filed on Oct. 13, 2011, provisional application No. 61/549,196, filed on Oct. 19, 2011.

(51) Int. Cl.
*H04W 72/04* (2009.01)
*H04L 5/00* (2006.01)
*H04B 7/26* (2006.01)

(52) U.S. Cl.
CPC ......... *H04W 72/0446* (2013.01); *H04B 7/2656* (2013.01); *H04L 5/0053* (2013.01); *H04L 5/001* (2013.01)

(58) Field of Classification Search
None
See application file for complete search history.

(56) References Cited

U.S. PATENT DOCUMENTS

| 8,711,790 B2 * | 4/2014 | Lindh | H04L 5/0057 370/310 |
| 8,923,201 B2 * | 12/2014 | Papasakellariou | H04W 72/042 370/328 |
| 2010/0254268 A1 | 10/2010 | Kim et al. | |

(Continued)

FOREIGN PATENT DOCUMENTS

| KR | 10-2010-0110272 A | 10/2010 |
| KR | 10-2011-0036484 A | 4/2011 |

(Continued)

*Primary Examiner* — Min Jung
(74) *Attorney, Agent, or Firm* — Birch, Stewart, Kolasch & Birch, LLP

(57) ABSTRACT

The present invention relates to a wireless communication system. Particularly, the present invention pertains to a method for receiving a PDCCH signal in a wireless communication system and a device therefor, and the method comprises: receiving a subframe that includes a PDCCH search space, monitoring a plurality of PDCCH candidates in the PDCCH search space, and performing an operation according to a PDCCH signal if the PDCCH signal indicated to the UE is detected, wherein if the subframe is a first subframe, the PDCCH search space is configured in a first time domain of the subframe, if the subframe is a second subframe, the PDCCH search space is configured in a second time domain of the subframe, and the first time domain and the second time domain are multiplexed at the subframe by time division multiplexing (TDM).

15 Claims, 13 Drawing Sheets

(56) References Cited

U.S. PATENT DOCUMENTS

| | | |
|---|---|---|
| 2011/0081935 A1 | 4/2011 | Yeon et al. |
| 2012/0269113 A1 | 10/2012 | Park et al. |
| 2013/0003604 A1* | 1/2013 | Blankenship ......... H04L 5/0053 370/255 |
| 2013/0039188 A1* | 2/2013 | Larsson ................ H04L 5/0053 370/241 |
| 2013/0058285 A1* | 3/2013 | Koivisto ............... H04L 1/0046 370/329 |
| 2013/0064196 A1* | 3/2013 | Gao ...................... H04L 5/0016 370/329 |
| 2013/0070693 A1 | 3/2013 | Kwon et al. |
| 2013/0083666 A1* | 4/2013 | Gaal ..................... H04L 5/0053 370/241 |
| 2014/0003349 A1* | 1/2014 | Kang .................... H04L 5/0053 370/328 |
| 2014/0044070 A1* | 2/2014 | Chen .................... H04B 7/0486 370/329 |
| 2014/0247775 A1* | 9/2014 | Frenne ................. H04L 5/0048 370/329 |
| 2014/0328295 A1* | 11/2014 | Ko ........................ H04L 5/0053 370/329 |

FOREIGN PATENT DOCUMENTS

| | | |
|---|---|---|
| KR | 10-2011-0039207 A | 4/2011 |
| KR | 10-2011-0082899 A | 7/2011 |

* cited by examiner

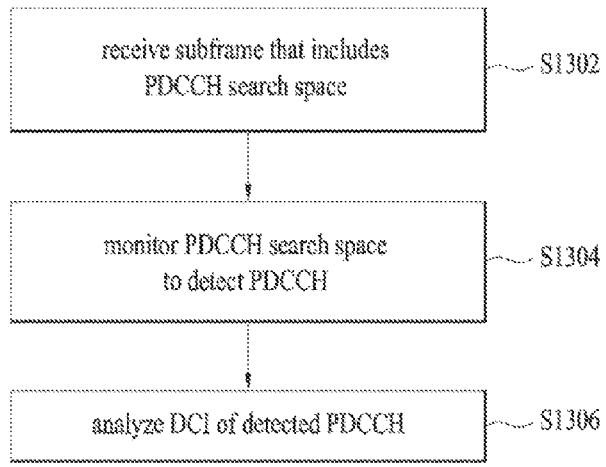
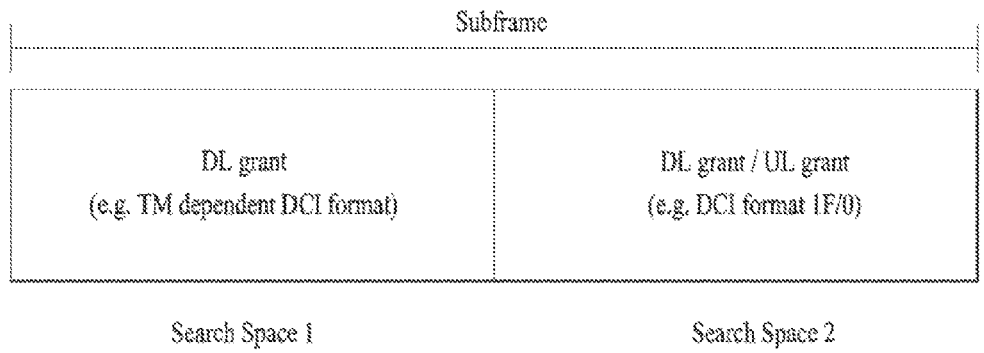

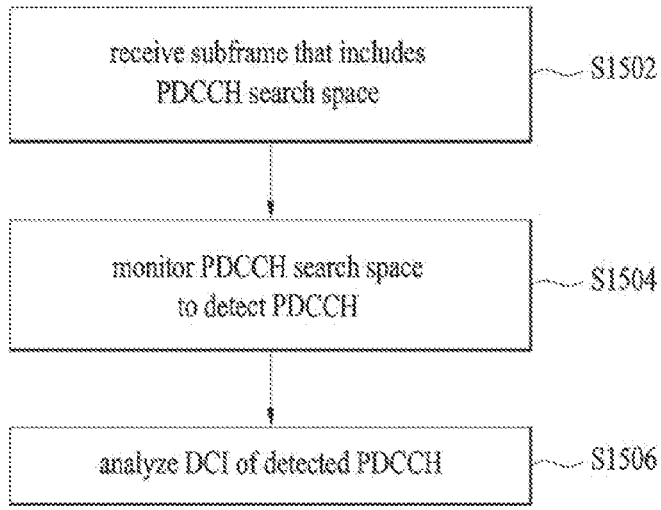
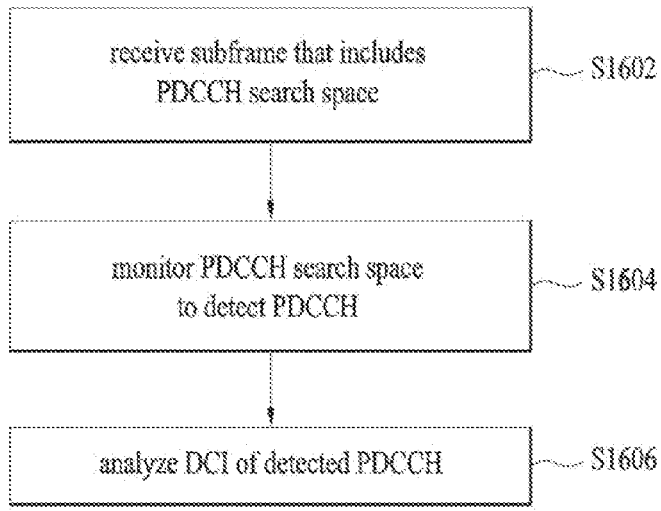

METHOD AND DEVICE FOR RECEIVING CONTROL INFORMATION IN WIRELESS COMMUNICATION SYSTEM

CROSS REFERENCE TO RELATED APPLICATIONS

This application is the National Phase of PCT/KR2012/008406 filed on Oct. 15, 2012, which claims priority under 35 U.S.C. §119(e) to U.S. Provisional Application No. 61/547,016 filed on Oct. 13, 2011, and to U.S. Provisional Application No. 61/549,196 filed on Oct. 19, 2011, all of which are hereby expressly incorporated by reference into the present application.

TECHNICAL FIELD

The present invention relates to a wireless communication system, and more particularly, to a method and device for transmitting and receiving control information. The wireless communication system may support carrier aggregation (CA).

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention devised to solve the conventional problem is to provide a method for efficiently transmitting and receiving control information in a wireless communication system and a device for the same. Another object of the present invention is to provide a channel format, resource allocation and signal processing for efficiently transmitting and receiving control information, and a device for the same. Other object of the present invention is to provide a method for efficiently allocating resources for transmitting and receiving control information and a device for the same.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In one aspect of the present invention, a method receiving a physical downlink control channel (PDCCH) signal in a wireless communication system comprises: receiving a subframe that includes a PDCCH search space; monitoring a plurality of PDCCH candidates in the PDCCH search space; and performing an operation according to a PDCCH signal if the PDCCH signal indicated to the UE is detected, wherein the PDCCH search space is configured in a first time domain of the subframe if the subframe is a first subframe, the PDCCH search space is configured in a second time domain of the subframe if the subframe is a second subframe, and the first time domain and the second time domain are multiplexed at the subframe by time division multiplexing (TDM).

In another aspect of the present invention, a user equipment (UE) for use in a wireless communication system comprises a radio frequency (RF) unit; and a processor, wherein the processor is configured to receive a subframe that includes a PDCCH search space, monitor a plurality of PDCCH candidates in the PDCCH search space, and perform an operation according to a PDCCH signal if the PDCCH signal indicated to the UE is detected, the PDCCH search space is configured in a first time domain of the subframe if the subframe is a first subframe, the PDCCH search space is configured in a second time domain of the subframe if the subframe is a second subframe, and the first time domain and the second time domain are multiplexed at the subframe by time division multiplexing (TDM).

Preferably, the first time domain includes first N number of orthogonal frequency division multiplexing (OFDM) symbols of the subframe, and the second time domain includes OFDM symbols after the (N+1)th OFDM symbol at the subframe.

Preferably, the PDCCH search space is a common search space (CSS) if the subframe is the first subframe, and the PDCCH search space is a user equipment (UE)-specific search space (USS) if the subframe is the second subframe.

Preferably, the first subframe is the subframe for legacy (L)-PDCCH transmission, and the second subframe is the subframe for enhanced (E)-PDCCH transmission.

Preferably, if the PDCCH signal indicated to the user equipment carries a transmission mode (TM)-common downlink control information (DCI) format, information within the TM-common DCI format is analyzed differently depending on a time domain where the PDCCH signal is detected.

Preferably, if the PDCCH signal indicated to the user equipment has a first radio network temporary identifier (RNTI), the PDCCH signal includes uplink or downlink scheduling information, and if the PDCCH signal indicated to the user equipment has a second RNTI, the PDCCH signal includes hybrid automatic repeat request (HARQ) response information on uplink transmission.

Advantageous Effects

According to the present invention, control information may efficiently be transmitted in the wireless communication system. Also, a channel format, resource allocation, and a signal processing method for efficiently transmitting control information may be provided. Also, resources for transmitting control information may be allocated efficiently.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 13 to 16 are diagrams illustrating methods for receiving and processing control information in accordance with the present invention.

BEST MODE FOR CARRYING OUT THE INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE. For clarification of the description, although the present invention will be described based on the 3GPP LTE/LTE-A, it is to be understood that technical spirits of the present invention are not limited to the 3GPP LTE/LTE-A.

In a wireless access system, a user equipment receives information from a base station through a downlink (DL), and also transmits information to the base station through an uplink (UL). Examples of information transmitted and received between the user equipment and the base station include data and various kinds of control information. Various physical channels exist depending on types and usage of information transmitted or received between the user equipment and the base station.

Figure 1:
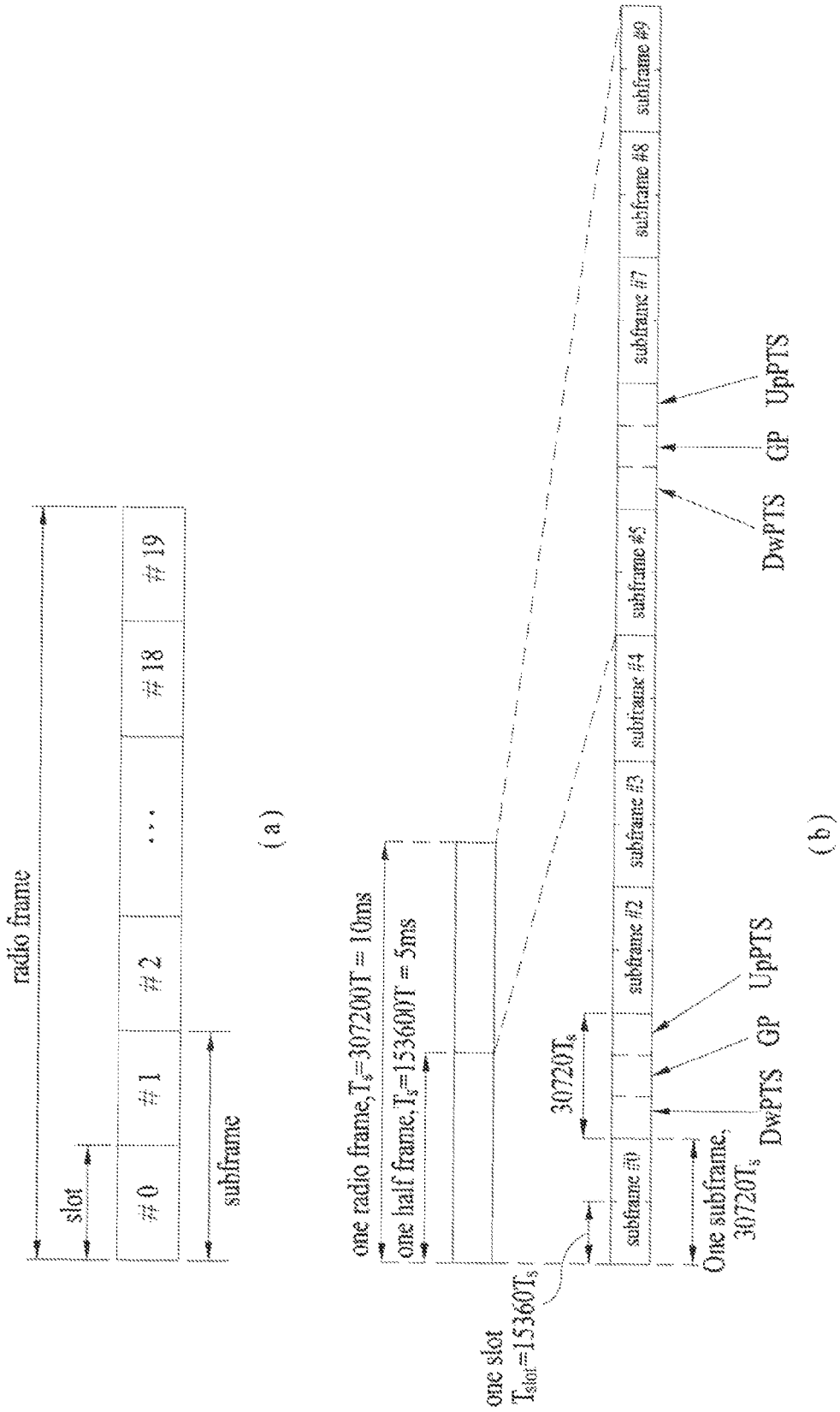
FIG. 1 is a diagram illustrating a structure of a radio frame.

FIG. 1 is a diagram illustrating a structure of a radio frame. In a cellular OFDM communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of the subframe may be allocated to a physical downlink control channel (PDCCH), and the other OFDM symbols may be allocated to a physical downlink shared channel (PDSCH).

FIG. 1(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization or channel estimation at the user equipment. The UpPTS is used to synchronize channel estimation at the base station with uplink transmission of the user equipment. Also, the guard period is to remove interference occurring in the uplink due to multipath delay of downlink signals between the uplink and the downlink.

The structure of the radio frame is only exemplary, and various modifications may be made in the number of subframes included in the radio frame, the number of slots included in the subframe, or the number of symbols included in the slot.

Figure 2:
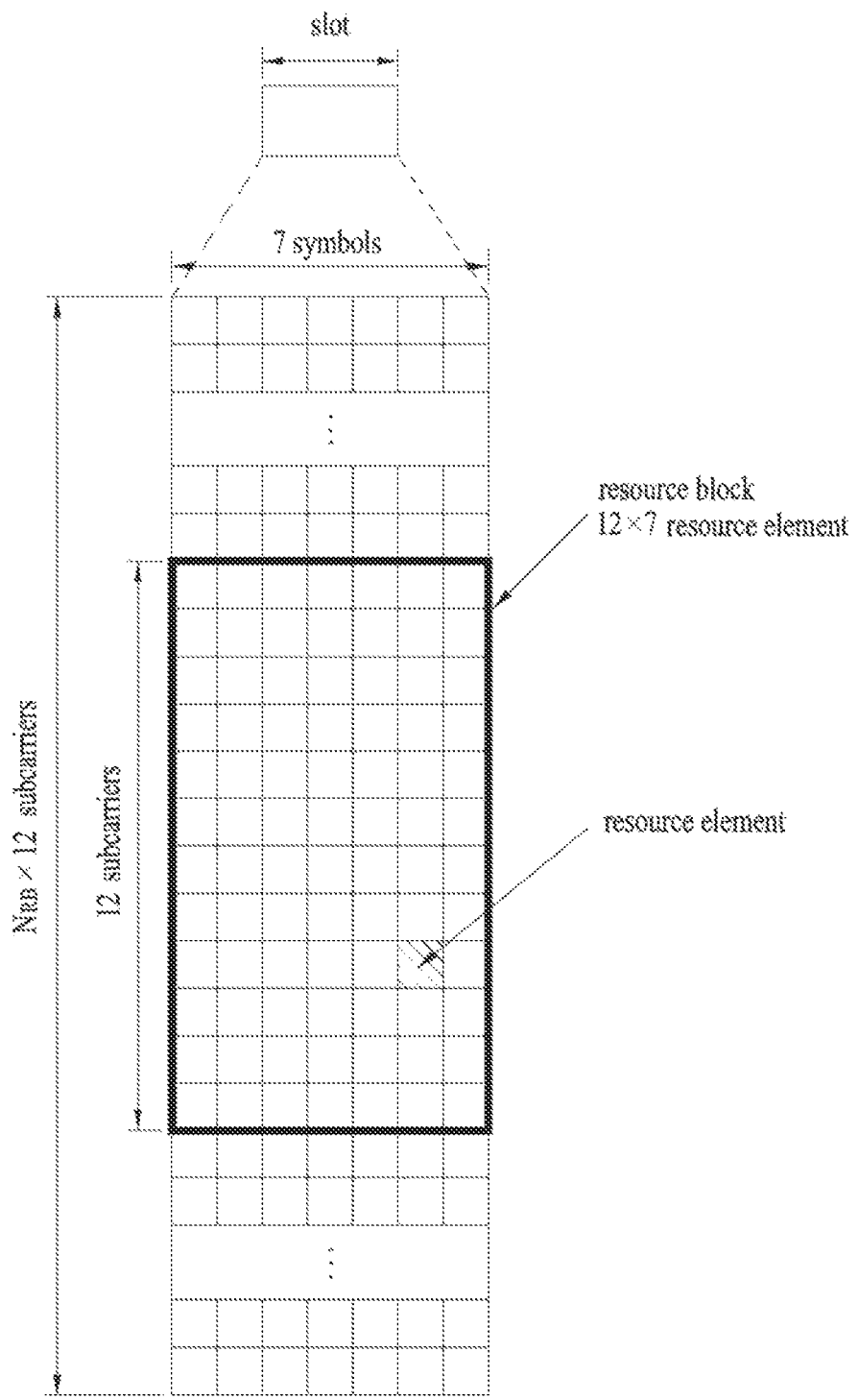
FIG. 2 is a diagram illustrating a resource grid of a downlink slot.

FIG. 2 is a diagram illustrating a resource grid of a downlink slot.

Referring to FIG. 2, the downlink slot includes a plurality of OFDM symbols in a time domain. In this case, one downlink slot includes, but not limited to, seven OFDM symbols, and one resource block (RB) includes, but not limited to, twelve subcarriers in a frequency domain. Each element on the resource grid will be referred to as a resource element (RE). One resource block (RB) includes 12×7(6) resource elements. The number NDL of resource blocks (RBs) included in the downlink slot depends on a downlink transmission bandwidth. A structure of an uplink slot may be the same as that of the downlink slot.

Figure 3:
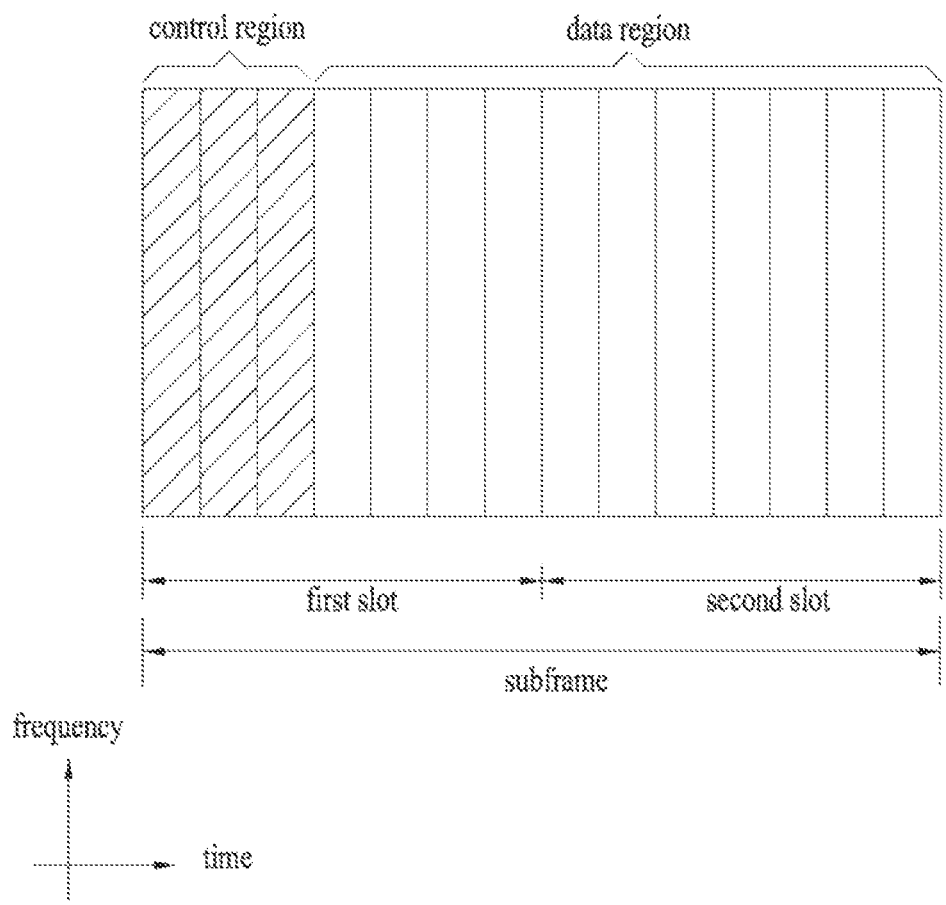
FIG. 3 is a diagram illustrating a structure of a downlink subframe.

FIG. 3 is a diagram illustrating a structure of a downlink subframe.

Referring to FIG. 3, the subframe includes two time regions multiplexed in accordance with a time division multiplexing (TDM) mode. The first time region is used for transmission of a control channel, and the second time region is used for transmission of a shared channel. For convenience, the first time region will be referred to as a control region, and the second time region will be referred to as a data region. For example, maximum three (four) OFDM symbols located at the front of the first slot within the subframe correspond to the control region to which a control channel is allocated. The other OFDM symbols correspond to the data region to which a physical downlink shared channel (PDSCH) is allocated, wherein basic resource unit of the data region is RB. Examples of the downlink control channel used in the LTE include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and carries information on the number of OFDM symbols used for transmission of the control channel within the subframe. The PHICH is a response to uplink transmission, and carries HARQ ACK/NACK (acknowledgement/negative-acknowledgement) signal. The control information transmitted through the PDCCH will be referred to as downlink control information (DCI). The DCI includes uplink or downlink scheduling information or uplink transmission (Tx) power control command for user equipment group.

The control information transmitted through the PDCCH will be referred to as downlink control information (DCI). The DCI format includes formats 0, 3, 3A and 4 defined for an uplink and formats 1, 1A, 1B, 1C, 1D, 2, 2A, 2B and 2C defined for a downlink. A type of information fields, the number of information fields, and the number of bits of each information field are varied depending on the DCI format. For example, the DCI format selectively includes information such as a hopping flag, RB assignment, a modulation coding scheme (MCS), redundancy version (RV), new data indicator (NDI), transmit power control (TPC), a HARQ process number, and precoding matrix indicator (PMI) confirmation in accordance with usage. Accordingly, a size of control information matched with the DCI format is varied depending on the DCI format. Meanwhile, a random DCI format may be used for transmission of two or more kinds of control information. For example, the DCI formats 0 and 1A are used to carry the DCI format 0 or the DCI format 1, and are identified from each other by a flag field.

The PDCCH carries transport format and resource allocation information of a downlink shared channel (DL-SCH), resource allocation information of an uplink shared channel (UL-SCH), paging information on a paging channel (PCH), system information on the DL-SCH, resource allocation information of an upper layer control message such as a random access response transmitted on the PDSCH, a transmission power control command of individual user equipments (UEs) within a user equipment group, and activation of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide a PDCCH of a predetermined coding rate in accordance with the status of a radio channel. The CCE corresponds to a plurality of resource element groups (REGs). The format of the PDCCH and the number of available bits of the PDCCH are determined depending on the correlation between the number of CCEs and the coding rate provided by the CCE. The base station determines a PDCCH format depending on the DCI to be transmitted to the user equipment, and attaches cyclic redundancy check (CRC) to the control information. The CRC is masked with a unique identifier (for example, radio network temporary identifier (RNTI)) depending on owner or usage of the PDCCH. For example, if the PDCCH is for a specific user equipment, the CRC may be masked with a unique identifier (for example, cell-RNTI (C-RNTI)) of the corresponding user equipment. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). The CRC is masked with a random access RNTI (RA-RNTI) to indicate a random access response that is a response to transmission of a random access preamble of the user equipment.

The PDCCH carries a message known as downlink control information (DCI), and the DCI includes resource allocation information for one user equipment or user equipment group and other control information. Generally, a plurality of PDCCHs may be transmitted within one subframe. Each PDCCH is transmitted using one or more control channel elements (CCEs), each of which corresponds to nine sets of four resource elements. Four resource elements will be referred to as a resource element group (REG). Four QPSK symbols are mapped into one REG. A resource element (RE) allocated to the reference signal (RS) is not included in the REG. Accordingly, a total number of REGs within given OFDM symbols are varied depending on the presence of a cell-specific reference signal. The REG concept (that is, group unit mapping, each group includes four resource elements) is used for other downlink control channels (that is, PDFICH and PHICH). In other words, the REG is used in a basic resource unit of the control region. Four DCI formats are supported as listed in Table 3.

TABLE 1

| PUCCH format | Number of CCEs (n) | Number of REGs | Number of PUCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

CCEs are used by being numbered continuously. In order to simplify a decoding process, the PDCCH having a format that includes n number of CCEs may start from only CCE having a number equivalent to a multiple of n. The number of CCEs used for transmission of a specific PDCCH is determined by the base station in accordance with a channel condition. For example, if the PDCCH is for a user equipment having a good downlink channel (for example, adjacent to BS), one CCE may be required. However, in case of a user equipment having a poor channel (for example, adjacent to the cell edge), eight CCEs may be used to obtain sufficient robustness. Also, a power level of the PDCCH may be adjusted to correspond to the channel condition.

The LTE system defines location of a limited set of CCEs, where the PDCCH may be located for each user equipment. The location of the limited set of CCEs, where the user equipment may discover its PDCCH, may be referred to as a search space (SS). In the LTE system, the search space has different sizes depending on each PDCCH format. Also, user equipment specific (UE-specific) and common search spaces are defined separately. The UE-specific search space (USS) is configured separately for each user equipment, and the range of the common search space (CSS) is notified to al the user equipments. The UE-specific and common search spaces may be overlapped for the given user equipment.

Table 2 illustrates sizes of the common and UE-specific search spaces.

TABLE 2

| PUCCH format | The number of CCEs (n) | The number of candidates within a common search space | The number of candidates within UE-specific search space |
|---|---|---|---|
| 0 | 1 | — | 6 |
| 1 | 2 | — | 6 |
| 2 | 4 | 4 | 2 |
| 3 | 8 | 2 | 2 |

A plurality of PDCCHs may be transmitted within the control region of the same subframe. The base station does not provide the user equipment with information as to where the corresponding PDCCH is within the control region. Accordingly, the user equipment discovers its PDCCH by monitoring an aggregation of PDCCH candidates within the subframe. In this case, monitoring means that the user equipment tries to decode each of the PDCCH candidates in accordance with each DCI format. This will be referred to as blind decoding (BD). Through BD, the user equipment performs identification of the PDCCH transmitted thereto and decoding of control information transmitted through the corresponding PDCCH. For example, if the PDCCH is demasked with C-RNTI and there is no CRC error, the user equipment detects its PDCCH. The user equipment is required to perform BD of maximum 44 times within one frame.

Figure 4:
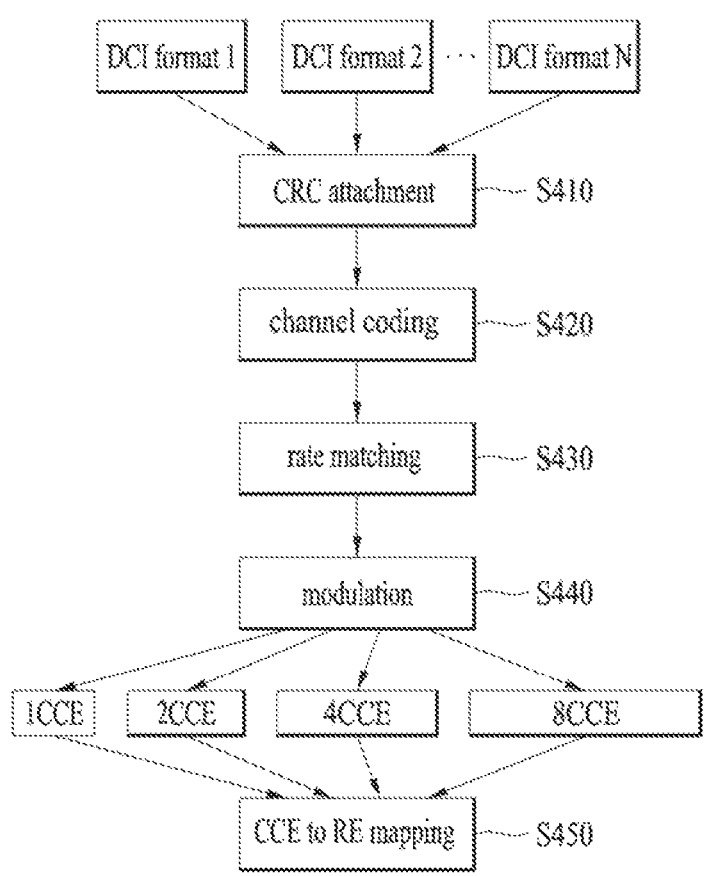
FIG. 4 is a diagram illustrating a procedure of processing a PDCCH in a base station.

FIG. 4 is a flow chart illustrating a procedure of processing a PDCCH in a base station.

Referring to FIG. 4, the base station generates control information in accordance with the DCI format. The base station may select one of a plurality of DCI formats (DCI format 1, 2, ..., N) in accordance with control information to be transmitted to the user equipment. At step S410, the base station attaches cyclic redundancy check (CRC) for error detection to the control information generated in accordance with each DCI format. The CRC is masked with an identifier (for example, radio network temporary identifier (RNTI)) depending on owner or usage of the PDCCH. In other words, the PDCCH is CRC scrambled with the identifier (for example, RNTI).

Table 3 illustrates an example of identifiers masked in the PDCCH.

TABLE 3

| Type | Identifier | Description |
|---|---|---|
| UE-specific | C-RNTI, temporary C-RNTI, semi-persistent C-RNTI | used for a unique UE identification |

TABLE 3-continued

| Type | Identifier | Description |
|---|---|---|
| Common | P-RNTI | used for paging message |
|  | SI-RNTI | used for system information |
|  | RA-RNTI | used for random access response |

If C-RNTI, temporary C-RNTI or semi-persistent C-RNTI is used, the PDCCH carries the control information for the corresponding specific user equipment. If the other RNTI is used, the PDCCH carries common control information received by all the user equipments within the cell. At step S420, channel coding is performed for the control information with CRC, whereby coded data (codeword) are generated. At step S430, rate matching based on the CCE aggregation level allocated to the PDCCH format is performed. At step S440, the coded data are modulated to generate modulated symbols. The modulated symbols constituting one PDCCH may have one of CCE aggregation levels of 1, 2, 4, and 8. At step S450, the modulated symbols are mapped into physical resource elements (REs) (CCE to RE mapping).

Figure 5:
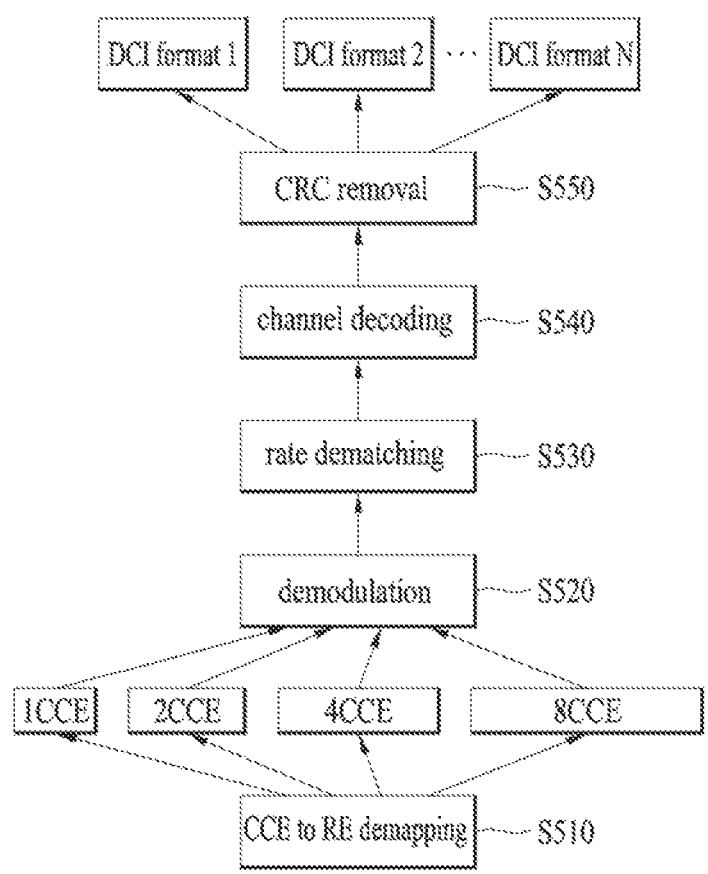
FIG. 5 is a diagram illustrating a procedure of processing a PDCCH in a user equipment.

FIG. 5 is a diagram illustrating a procedure of processing a PDCCH in a user equipment.

Referring to FIG. 5, the user equipment performs demapping of physical resource elements to CCEs (CCE to RE demapping) at step S510. At step S520, since the user equipment does not know what CCE aggregation level should be used to receive the PDCCH, the user equipment performs demodulation for each CCE aggregation level. At step S530, the user equipment performs rate dematching for the demodulated data. Since the user equipment does not know what DCI format (or DCI payload size) of control information should be received therein, the user equipment performs rate dematching for each DCI format (or DCI payload size). At step S540, the user equipment performs channel decoding for the rate dematched data in accordance with a coding rate, and detects whether an error has occurred, by checking CRC. If an error has not occurred, the user equipment detects its PDCCH. If the error has occurred, the user equipment continues to perform blind decoding for the other CCE aggregation level or the other DCI format (or DCI payload size). At step S550, the user equipment that has detected its PDCCH removes CRC from the decoded data and acquires control information.

Figure 6:
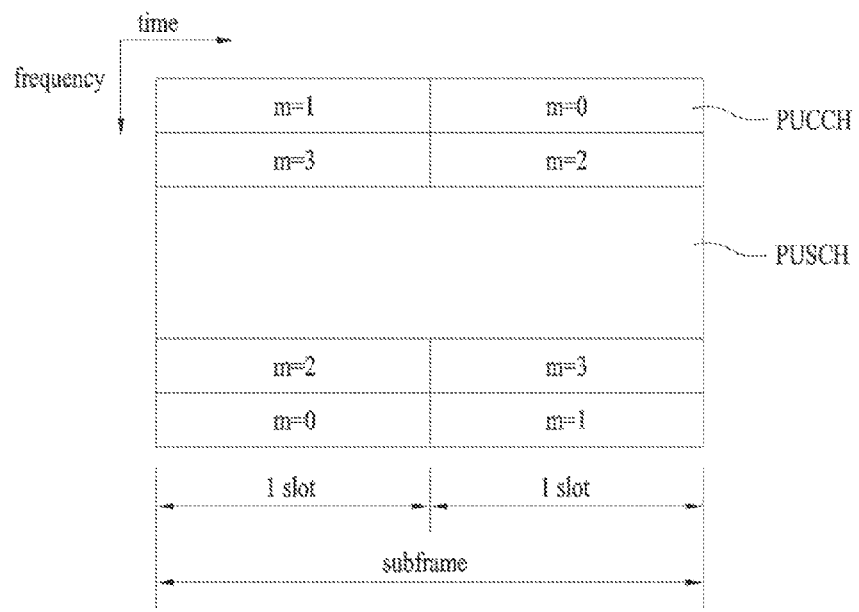
FIG. 6 is a diagram illustrating a structure of an uplink subframe.

FIG. 6 is a diagram illustrating a structure of an uplink subframe in an LTE system.

Referring to FIG. 6, the uplink subframe includes a plurality of slots (for example, two). Each slot may include a plurality of SC-FDMA symbols, wherein the number of SC-FDMA symbols included in each slot is varied depending on a cyclic prefix (CP) length. For example, in case of the normal CP, the slot may include seven SC-FDMA symbols. The uplink subframe is divided into a data region and a control region in a frequency domain. The data region includes a PUSCH, and is used to transmit a data signal such as voice. The control region includes a PUCCH, and is used to transmit control information. The PUCCH includes RB pair (for example, m=0, 1, 2, 3) located at both ends of the data region on a frequency axis, and performs hopping on the border of the slots. The control information includes HARQ A/N, channel quality information (CQI), precoding matrix indicator (PMI), and rank indication (RI).

Figure 7:
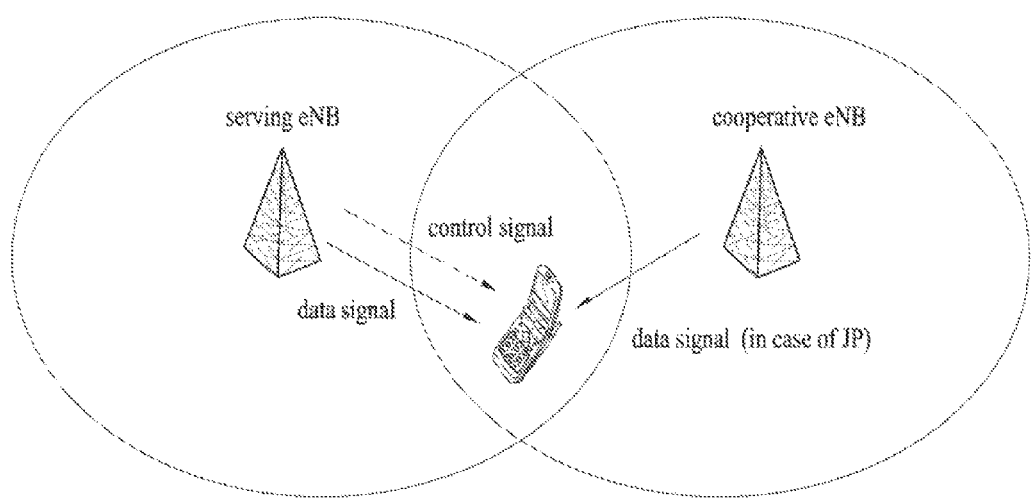
FIG. 7 is a diagram illustrating a coordinated multi point (CoMP) transmission system.

FIG. 7 is a diagram illustrating a coordinated multi point (CoMP) transmission system. The CoMP transmission system means that two or more transmission points (for example, base stations or cells) perform communication with a user equipment by coordinating with each other. The CoMP transmission system may be divided into a coordinated MIMO (multiple input multiple output) type joint processing (CoMP-JP) scheme through data sharing and a CoMP-coordinated scheduling/beamforming (CoMP-CS/CB) scheme.

Referring to FIG. 7, the user equipment is operated by receiving control information from a serving base station (eNB). FIG. 7 illustrates that data are transmitted from the serving eNB and a cooperative eNB at the same time in accordance with the JP scheme. If the CS/CB scheme is used, the data are transmitted from the serving base station only. In case of dynamic point selection (DPS), the data are transmitted from the base station dynamically selected within a cooperative cell set that includes a serving base station and one or more cooperative base stations.

Figure 8:
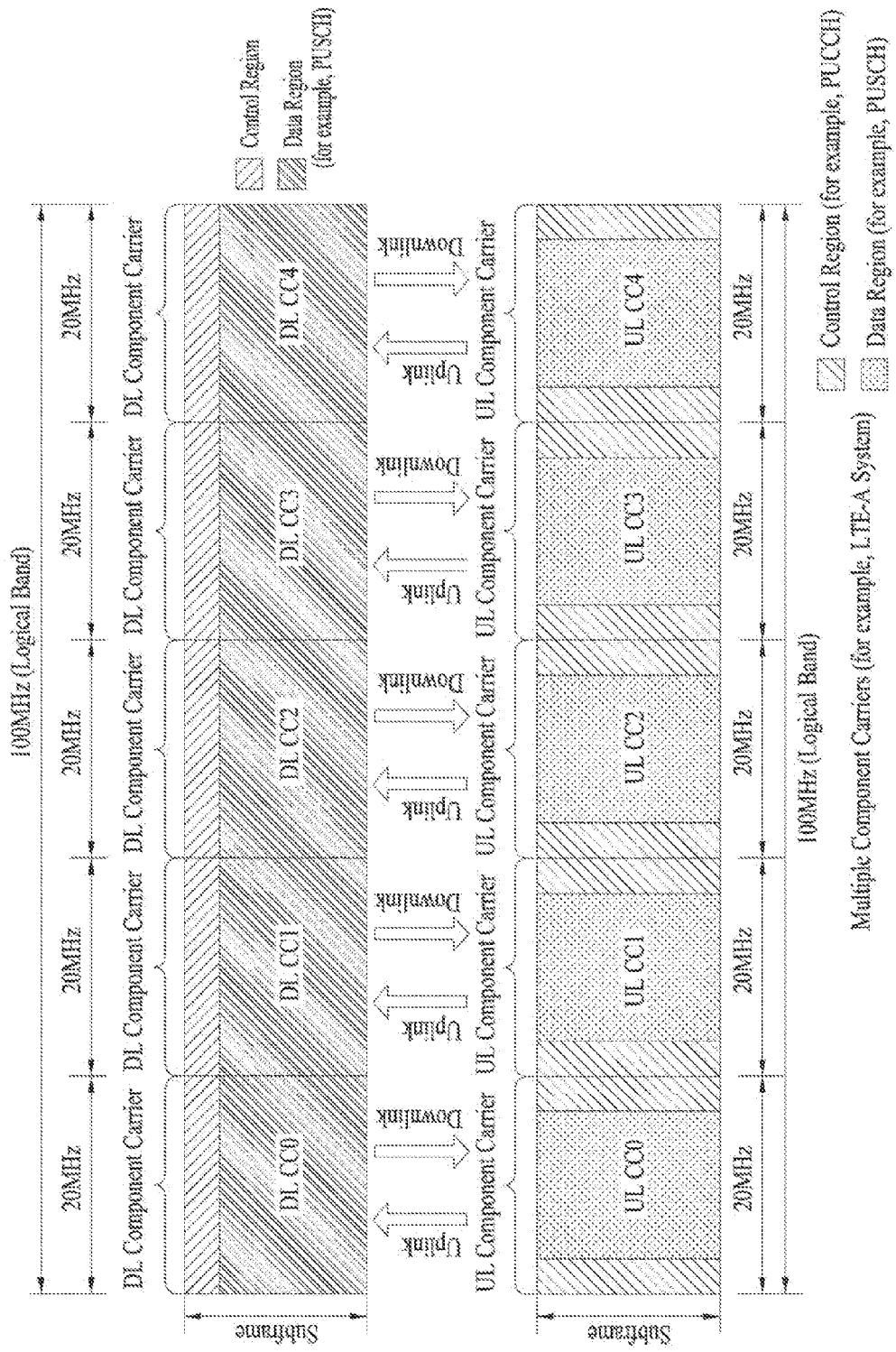
FIG. 8 is a diagram illustrating a carrier aggregation (CA) communication system.

FIG. 8 is a diagram illustrating a carrier aggregation (CA) communication system.

Referring to FIG. 8, a plurality of uplink/downlink component carriers (CC) may be collected to support wider uplink/downlink bandwidths. The respective CCs may adjoin each other or not in the frequency domain. A bandwidth of each component carrier may be defined independently. Asymmetric carrier aggregation where the number of UL CCs is different from the number of DL CCs may be performed. Meanwhile, the control information may be set to be transmitted and received through a specific CC only. This specific CC may be referred to as a primary CC (PCC), and the other CCs may be referred to as secondary CCs, For example, if cross-carrier scheduling (or cross-CC scheduling) is used, the PDCCH for downlink allocation is transmitted to DL CC#0, and the corresponding PDSCH may be transmitted to DL CC#2. The terminology "component carrier" may be replaced with an equivalent another terminology (for example, carrier, cell, etc.).

For cross-carrier scheduling, a carrier indicator field (CIF) is used. Configuration of the presence or not of the CIF within the PDCCH may be enabled by higher layer signaling (for example, RRC signaling) semi-statically and user equipment-specifically (or user equipment group-specifically). The base line of PDCCH transmission will be summed up as follows.

CIF disabled: the PDCCH on the DL CC allocates PDSCH resource on the same DL CC or PUSCH resource on one linked UL CC.
No CIF
CIF enabled: the PDCCH on the DL CC may allocate PDSCH or PUSCH resource on one DL/UL CC of a plurality of aggregated DL/UL CCs by using the CIF.
LTE DCI format extended to have CIF
CIF (if configured) is a fixed x-bit field (for example, x=3)
CIF (if configured) location is fixed regardless of DCI format size.

If the CIF exists, the base station may allocate a PDCCH monitoring DL CC (set) to reduce complexity of blind decoding (BD) in view of the user equipment. For PDSCH/PUSCH scheduling, the user equipment may detect and decode the PDCCH on the corresponding DL CC only. Also, the base station may transmit the PDCCH through monitoring DL CC (set) only. The monitoring DL CC set may be configured user equipment-specifically, user equipment group-specifically or cell-specifically.

Figure 9:
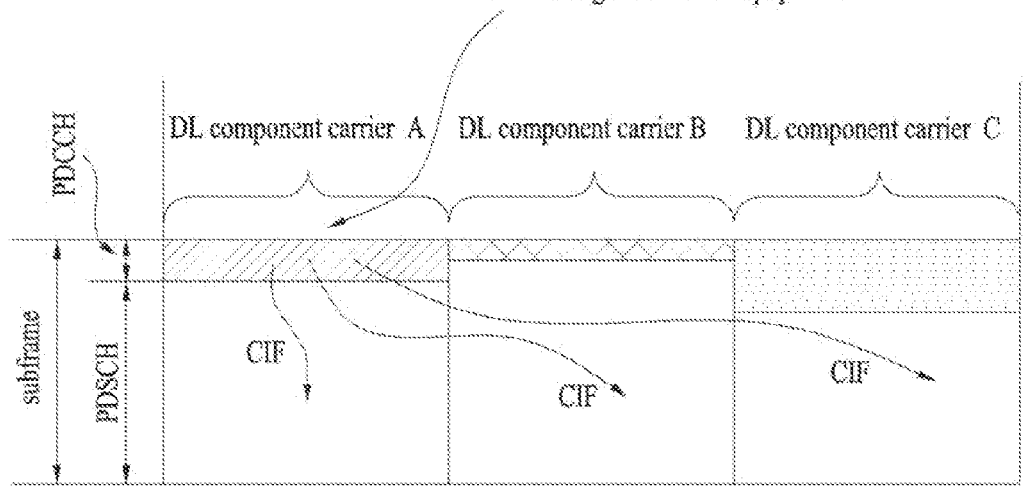
FIG. 9 is a diagram illustrating cross-carrier scheduling.

FIG. 9 illustrates that three DL CCs are aggregated and DL CC A is set to a PDCCH monitoring DL CC. If the CIF is disabled, each DL CC may transmit the PDCCH that schedules a PDSCH of each DL CC without CIF in accordance with the LTE PDCCH rule. On the other hand, if the CIF is enabled by higher layer signaling, only the DL CC A may transmit the PDCCH, which schedules the PDSCH of another CC as well as the PDSCH of the DL CC A, by using the CIF. The PDCCH is not transmitted from the DL CC B and DL CC C which are not set to the PDCCH monitoring DL CC. In this case, the monitoring DL CC may be replaced with equivalent terms such as monitoring carrier, monitoring cell, scheduling carrier, scheduling cell, serving carrier, and serving cell. The DL CC to which the PDSCH corresponding to the PDCCH and the UL CC to which the PUSCH corresponding to the PDCCH is transmitted may be referred to as scheduled carrier, scheduled cell, etc.

In the 3GPP LTE/LTE-A system, as described with reference to FIG. 3, FDD DL carrier and TDD DL subframes use first n number of OFDM symbols of the subframe for transmission of PDCCH, PHICH, and PCFICH, which are physical channels for transmission of various kinds of control information, and use the other OFDM symbols for PDSCH transmission. The number of symbols used for transmission of control channel for each subframe is forwarded to the user equipment dynamically through the physical channel such as PCFICH, or semi-statically through RRC signaling. The value of n may be set to one symbol to maximum four symbols in accordance with subframe features and system features (FDD/TDD, system band, etc.). Meanwhile, in the LTE system according to the related art, the PDCCH which is a physical channel for DL/UL scheduling and transmitting various kinds of control information has limitation in that the PDCCH is transmitted through limited OFDM symbols. Accordingly, introduction of an enhanced PDCCH (E-PDCCH) multiplexed with the PDSCH more freely in accordance with FDM/TDM mode is considered.

Figure 10:
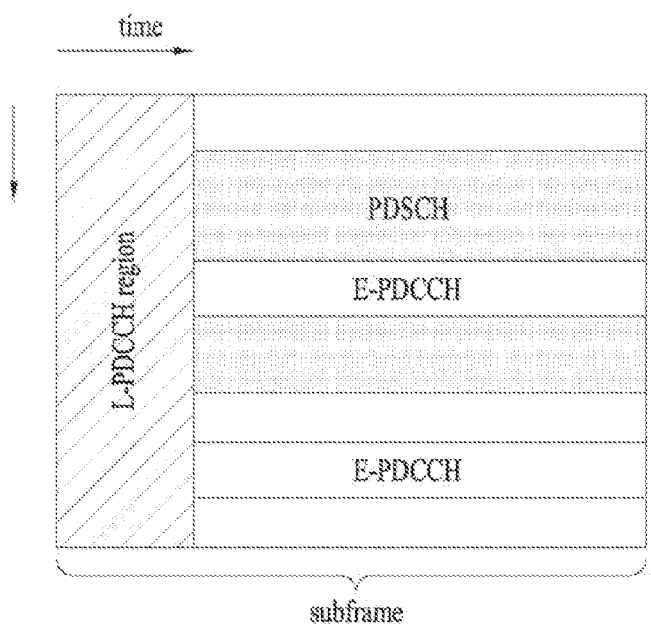
FIG. 10 is a diagram illustrating an example of allocating a PDCCH to a data region of a subframe.

FIG. 10 is a diagram illustrating an example of allocating a PDCCH to a data region of a subframe.

Referring to FIG. 10, a PDCCH (for convenience, legacy PDCCH) according to the LTE/LTE-A system of the related art may be allocated to the control region (see FIG. 3) of the subframe. In FIG. 10, an L-PDCCH region means a region to which the legacy PDCCH may be allocated. The L-PDCCH region may mean the control region, a control channel resource region (that is, CCE resource) to which the PDCCH may actually be allocated within the control region, or a PDCCH search space. Meanwhile, the PDCCH may additionally be allocated to the data region (for example, resource region for PDSCH, see FIG. 3). The PDCCH allocated to the data region will be referred to as E-PDCCH. FIG. 10 illustrates that the E-PDCCH is configured for the entire subframes in the time domain. However, FIG. 10 is only exemplary, and the E-PDCCH may exist in the time domain in a unit of slot.

The E-PDCCH carries DCI. Details on the DCI will be understood with reference to the description of Table 1. For example, the E-PDCCH may carry downlink scheduling information and uplink scheduling information. In other words, the user equipment may receive the E-PDCCH and receive data/control information through the PDSCH corresponding to the E-PDCCH. Also, the user equipment may receive the E-PDCCH and receive data/control information through the PUSCH corresponding to the E-PDCCH. E-PDCCH transmission processing (for example, channel coding, interleaving, multiplexing, etc.) may be performed by using processing (see FIGS. 4 and 5) defined in the LTE system of the related art within a possible range and may be varied if necessary.

The LTE system of the related art previously reserves a PDCCH candidate region (hereinafter, referred to as PDCCH search space) within the control region, and transmits a PDCCH of a specific user equipment to some region of the PDCCH candidate region. Accordingly, the user equipment may obtain its PDCCH within the PDCCH search space through blind decoding. Similarly, the E-PDCCH may be transmitted for some or all of the previously reserved resources.

Figure 11:
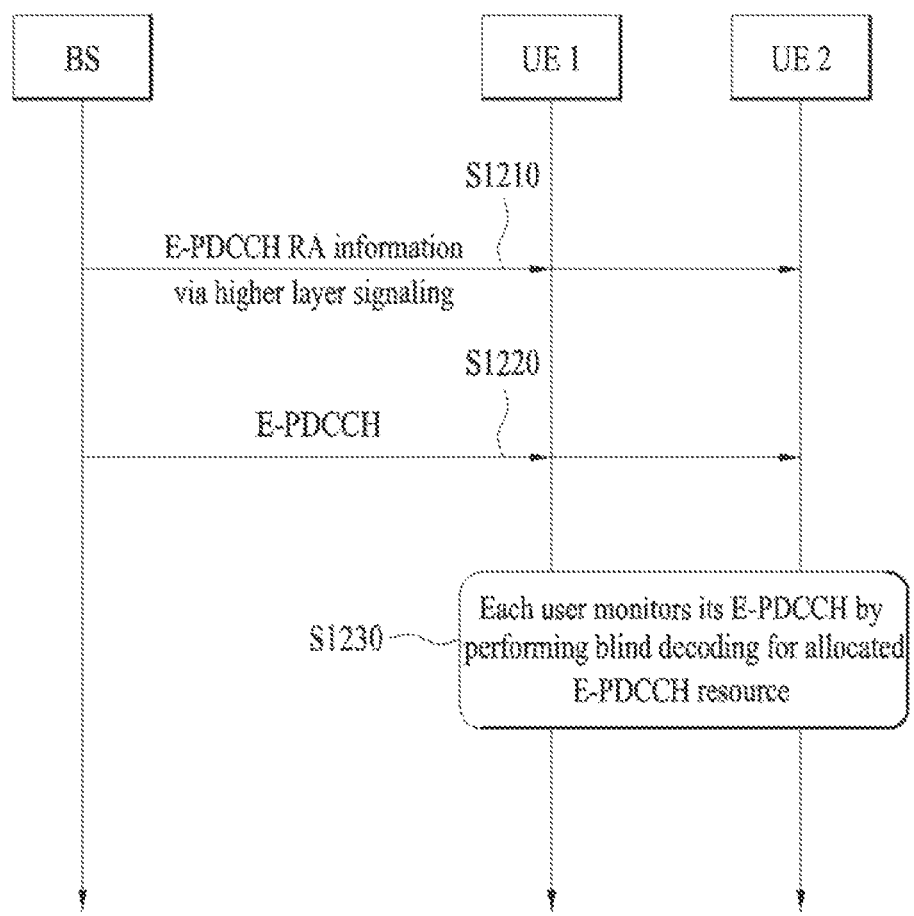
FIG. 11 is a diagram illustrating a procedure of allocating resources for E-PDCCH and receiving a PDSCH.

FIG. 11 is a diagram illustrating a procedure of allocating resources for E-PDCCH and receiving the E-PDCCH.

Referring to FIG. 11, the base station transmits E-PDCCH resource allocation (RA) information to the user equipment (S1210). The E-PDCCH RA information may include RB (or virtual resource block (VRB) allocation information. The RB allocation information may be given in a unit of RB or RBG (resource block group). The RBG includes two or more continuous RBs. The E-PDCCH RA information may be transmitted by using higher layer (for example, RRC) signaling. In this case, the E-PDCCH RA information is used to previously reserve the E-PDCCH resource (region). Afterwards, the base station transmits the E-PDCCH to the user equipment (S1220). The E-PDCCH may be transmitted within some region or full region of the reserved E-PDCCH resource (for example, M number of RBs) at step S1210. Accordingly, the user equipment monitors the resource (region) (hereinafter, referred to as E-PDCCH search space, simply referred to as search space) to which the E-PDCCH may be transmitted (S1230). The E-PDCCH search space may be given as a part of the allocated RB set at step S1210. In this case, monitoring includes blind decoding of a plurality of E-PDCCH candidates within the search space.

Figure 12:
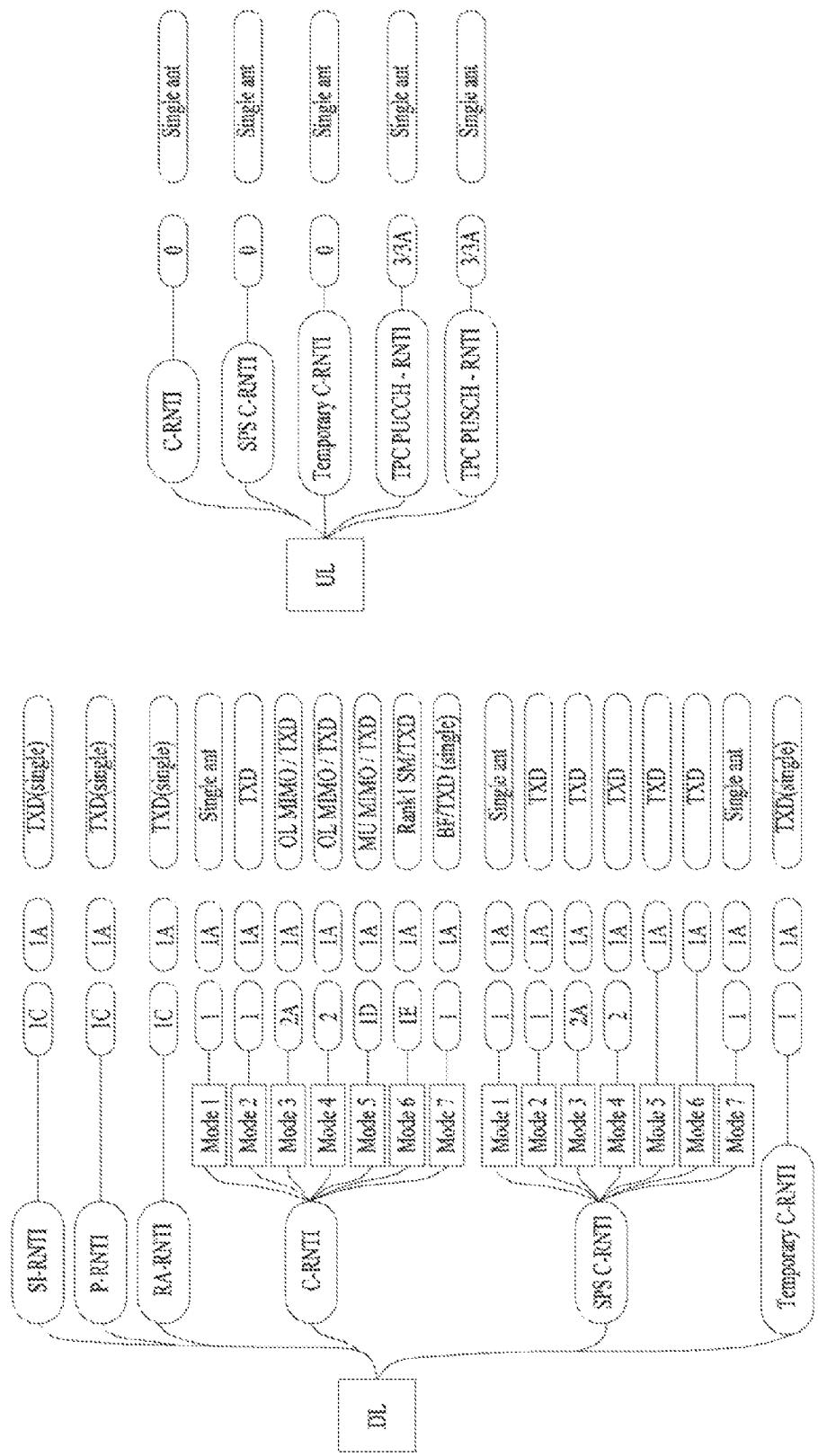
FIG. 12 is a diagram illustrating a DCI format to be detected by a user equipment in accordance with a transmission mode (TM)

FIG. 12 is a diagram illustrating a DCI format to be detected by a user equipment in accordance with a transmission mode (TM). The LTE(-A) system defines the transmission mode (TM) to limit blind decoding load, and defines DCI format which may be transmitted in accordance with each TM.

Referring to FIG. 12, the transmission mode and DCI format exist as follows.

Transmission Mode
Transmission mode 1: transmission from single base station antenna port
Transmission mode 2: transmission diversity
Transmission mode 3: open-loop spatial multiplexing
Transmission mode 4: closed-loop spatial multiplexing
Transmission mode 5: multi-user MIMO
Transmission mode 6: closed-loop rank-1 precoding
Transmission mode 7: transmission based on user equipment-specific reference signal DCI Format
Format 0: resource allocation (UL grant) for PUSCH transmission (uplink)
Format 1: resource allocation (DL grant) for single codeword PDSCH transmission (transmission modes 1, 2 and 7)
Format 1A: resource allocation for single codeword PDSCH (all transmission modes)
Format 1B: compact resource allocation for PDSCH (transmission mode 6) based on rank-1 closed-loop precoding
Format 1C: compact resource allocation for PDSCH (for example, paging/broadcast system information)
Format 1D: compact resource allocation for PDSCH (transmission mode 5) based on multi-user MIMO
Format 2: resource allocation for PDSCH (transmission mode 4) of closed-loop MIMO operation
Format 2A: resource allocation for PDSCH (transmission mode 3) of open-loop MIMO operation
Format 3/3A: power control for PUCCH and PUSCH The transmission modes are set semi-statically by higher layer (for example, RRC) signaling, and the user equipment performs blind decoding for one or more DCI formats in accordance with the transmission mode set therefor. Each transmission mode designates a DCI format to be blind-decoded by the user equipment. The DCI format 1A should be detected in common by all the transmission modes. For convenience, the DCI format to be detected specially by the user equipment in accordance with the transmission mode will be referred to as a TM-dependent DCI format, and the DCI format to be detected in common by the user equipment in all the transmission modes will be referred to as a TM-common DCI format. For example, if TM9 is set, the user equipment may obtain DCI by performing blind decoding for the DCI format 1A and the DCI format 2C in the UE-specific search space (USS). In this case, the DCI format 1A corresponds to the TM-common DCI format, and the DCI format 2C corresponds to the TM-dependent DCI format.

The greatest purpose of the DCI format 1A used in common in all the transmission modes is to support a fallback mode. For example, if the channel status is normal, the base station may transmit the control information by using the TM-dependent DCI format. If use of the TM-dependent DCI format is not appropriate due to abnormal channel status, the base station may transmit the control information by using the TM-common DCI format (that is, fall DCI format). Also, the DCI format 1A may be used by the base station to order (hereinafter, PDCCH order) the user equipment to transmit a random access channel (RACH) through the PDCCH, whereby uplink synchronization may be maintained.

Table 4 illustrates the control information transmitted by the DCI format 1A. In the following Table 4, bit size of each information field is only exemplary, and is not limited to the following.

TABLE 4

| | Information field | Bit(s) |
|---|---|---|
| (0) | Carrier indicator (cross-carrier scheduling) | 3 |
| (1) | Flag for identification of Format 0/Format 1A | 1 |
| (2) | Localized/distributed resource allocation flag | 1 |
| (3) | Resource block allocation | 7 |
| (4) | Modulation and coding scheme and redundancy version | 5 |
| (5) | HARQ process number | 3(4) |
| (6) | New data indicator | 1 |
| (7) | Redundancy version | 2 |
| (8) | TPC command for PUCCH | 2 |
| (9) | DAI (downlink assignment index) (TDD) | 3 |
| (10) | RNTI (CRC masked) | 16 |

* The DCI formats 0 and 1A have the same size and are identified from each other by flag.
* The DCI format 1A may be used to order the user equipment to initiate the RACH procedure through a PDCCH order. In this case, the localized/distributed resource allocation flag is set to 0, and the resource block allocation field is set to 1. In this case, 6 bits are used to indicate preamble index, and 4 bits are used to indicate physical RACH (PRACH) mask index. The remaining bits are set to 0.

Embodiment

Use of DCI Format in E-PDCCH

If the DCI format 1A is transmitted through the E-PDCCH, the DCI format 1A may not be used for the aforementioned purpose of use. In other words, the DCI format 1A may not be used for E-PDCCH fallback, and may not obtain the same purpose of use as far as there is not provided a channel existing in a PDSCH region, such as an enhanced RACH instead of the existing RACH, in a state that the PDCCH is not listened. In other words, if the E-PDCCH is used, the DCI format 1A may not be used for fallback and/or PDCCH order.

Accordingly, if the E-PDCCH is used, it may be considered to use the DCI format 1A for another purpose of use. As another method, the DCI format 1A may be excluded from blind decoding, whereby blind decoding complexity of the user equipment may be reduced. Alternatively, blind decoding complexity equivalent to the reduced blind decoding complexity may be applied to another DCI format (that is, TM-dependent DCI format), whereby PDCCH allocation flexibility may be improved. In this regard, the DCI format 1A for fallback in the LTE(-A) system of the related art is located in the CSS. Accordingly, this method may be understood that USS only exists in the E-PDCCH region (that is, CSS is excluded from the E-PDCCH region). In other words, the user equipment may try to perform blind decoding for the USS only to detect the E-PDCCH. In this case, the CSS may be set in L-PDCCH region. Accordingly, the user equipment may try to perform blind decoding for the CSS or CSS/USS in the L-PDCCH region.

Hereinafter, if the E-PDCCH is configured to be used, purpose of use of the DCI format will be suggested. Although the following suggestion will be described based on the DCI format 1A, the following suggestion is only exemplary and may be applied to another DCI format (for example, TM-common DCI format). In this case, the L-PDCCH region may mean a control region, a control channel resource region (that is, CCE resource) to which L-PDCCH may actually be allocated within the control region, or L-PDCCH search space in accordance with the context. Similarly, the E-PDCCH region may mean a data region (see FIG. 3), a control channel resource region (that is, VRB resource allocated by higher layer, see FIG. 11) to which PDCCH may actually be allocated within the data region, or E-PDCCH search space in accordance with the context. Hereinafter, the L-PDCCH and the E-PDCCH may be referred to as the PDCCH unless specially mentioned.

Method 1

This example suggests that the DCI format 1A is maintained for the E-PDCCH and information/contents of the DCI format 1A are used for dynamic signaling. For example, the DCI format 1A in the E-PDCCH may be used to transmit information (for example, R-PDCCH configuration information, PDSCH start symbol of SCell, etc.) dependent on the existing RRC signal, or may be used for new purpose of use/signaling such as E-PDCCH search space re-allocation. For example, although the E-PDCCH search space is configured in accordance with RRC signal (see FIG. 11), if the E-PDCCH search space is reconfigured or reallocated, the corresponding information may be transmitted through the DCI. When this information is applied and how this information is applied may previously be scheduled between the base station and the user equipment. For example, this information may be applied after a certain time (for example, 4 subframes) from the time when the DCI format 1A (E-PDCCH) is detected, or may be applied after ACK information on the DCI format 1A (E-PDCCH) is transmitted to the base station.

Also, various kinds of control information required for the CoMP operation may be included in the DCI format 1A (E-PDCCH). For example, the various kinds of control information may be included in the DCI format 1A as follows.

Examples of control information for multipoint TX/RX (Transmission/Reception)
Transmission point indication information
Information for interference measurement improvement and downlink reference signal (DL RS) improvement
Higher layer (for example, RRC) information indicating PDSCH start point
Channel state information reference signal (CSI-RS) configuration information and zero-power CSI-RS configuration information on CoMP measurement set (and/or possible cell(s))
Transmission mode configuration information
Feedback mode configuration information (including uplink channel configuration)
Semi-static/dynamic configuration information for solving a problem related to different CRS frequency shifts and PDSCH/CRS (cell specific reference signal) collision on different cells
Semi-static/dynamic configuration information for solving a problem related to different PDCCH region sizes on different cells
Information on multi-codebook limited set related to different transmission points
Antenna port and related scrambling sequence
CoMP operation based on dedicated CSI-RS port
Indication of CSI-RS ports of multiple sets instead of CSI-RS port of one set
Signaling on association of CSI-RS and cell ID The method suggested in this example may use a part only of the DCI format. For example, only a specific field of the DCI format 1A may be used for dynamic signaling of other information/contents in this example. Also, this method may be implemented in such a manner that the specific field of the DCI format is set to a default value for a specific purpose of use like the PDCCH order of the related art and information bit corresponding to the specific purpose of use is included in another field.

FIG. 13 is a diagram illustrating a method for receiving and processing control information in accordance with the embodiment of the present invention. Although FIG. 13 is illustrated in view of the user equipment, it will be apparent that a counteraction operation is performed by the base station.

Referring to FIG. 13, the user equipment receives a subframe that includes a PDCCH search space (S1302), and monitors the PDCCH search space to detect a PDCCH directed thereto (S1304). In this case, monitoring includes blind decoding of PDCCH candidates within the PDCCH search space. The PDCCH candidates are subjected to blind decoding on the assumption that the PDCCH candidates carry a specific DCI format according to the transmission mode. If the PDCCH is detected, the user equipment may analyze DCI of the PDCCH (S1306), and may perform the operation based on the analyzed DCI. In this example, DCI analysis may be varied considering a type (for example, L-PDCCH search space and E-PDCCH search space) of the search space where the PDCCH is detected. For example, if the PDCCH is detected in the L-PDCCH search space, the DCI may be analyzed to have information (for example, DL grant, UL grant, TPC, etc.) which previously is defined. On the other hand, if the PDCCH is detected in the E-PDCCH search space, the DCI may be analyzed to have information (for example, search space reconfiguration information, location of PDSCH start symbol, CoMP related information, etc.) of a specific purpose of use as suggested above. DCI analysis varied depending on the type of the search space where the PDCCH is detected may be applied to a specific DCI format (for example, TM-common DCI format, preferably DCI format 1A) only. In other words, in case of the TM-dependent DCI format, the PDCCH may be analyzed to have the same information regardless of the type of the detected search space.

Method 2

In case of the R-PDCCH according to the related art, the search space for DL grant is configured at the first slot of the backhaul subframe, and the search space for UL grant is configured at the second slot of the backhaul subframe. Accordingly, it is restricted such that the DL grant R-PDCCH is not located at the second slot and the UL grant R-PDCCH is not located at the first slot. This restriction may be mitigated using a modified DCI format 1A (hereinafter, referred to as DCI format 1F) or a new DCI format (hereinafter, referred to as DCI format X). For convenience, the DCI format 1F and the DCI format X will be referred to as DCI format 1F unless specially differentiated. In this case, the DCI format 1F means the DCI format modified/defined to be located at the second slot of the backhaul subframe. This method may be understood that blind decoding for the TM-common DCI format (for example, DCI format 1A) at the first slot of the backhaul subframe is omitted and blind decoding for the DCI format (for example, DCI format 1F) corresponding to the TM-common DCI format is performed at the second slot of the backhaul subframe. According to this method, blind decoding complexity for the TM-common DCI format (for example, DCI format 1A) at the first slot of the backhaul subframe may be reduced. The reduced blind decoding complexity may be used for early detection of another DCI format (for example, TM-dependent DCI format) at the first slot and R-PDCCH allocation flexibility.

FIG. 14 is a diagram illustrating an example of control information allocation according to the embodiment of the present invention. For convenience, the search space configured at the first slot of the backhaul subframe will be referred to as a search space 1, and the search space configured at the second slot of the backhaul subframe will be referred to as a search space 2. Although FIG. 14 assumes the backhaul subframe, the method according to this example may equally/similarly be applied to a case where the E-PDCCH is configured in a unit of slot.

Referring to FIG. 14, the TM-dependent DCI format may be located at the search space 1, and the DCI format 1F and the DCI format 0 may be located at the search space 2. In other words, DL grant (TM-dependent DCI format) may be transmitted through the search space 1, and DL grant (DCI format 1F)/UL grant (DCI format 0) may be transmitted through the search space 2. In this example, the DCI format 1F may be configured to have the same (payload) size as that of the DCI format 0. In this case, even though the DCI format 1F is transmitted from the search space 2, blind decoding complexity according to transmission of the DCI format 1F is not increased. However, if the DCI format 1F has the same (payload) size as that of the DCI format 0, information (for example, flag bit) for identifying the DCI format 1F and the DCI format 0 from each other will be required.

In the meantime, the DL grant is located at the search space 1 in the R-PDCCH structure of the related art to perform early decoding of the R-PDCCH and the PDSCH corresponding to the R-PDCCH. However, according to this example, since the DCI format 1F (DL grant) exists at the rear side (for example, second slot and search space 2) of the subframe, the advantage of early decoding at the R-PDCCH of TDM+FDM type may be lost. In order to solve this problem, the DCI format 1F may be used for transmission (for example, payload of small size and transport block of limited size) less affected by early decoding, or may be limited to support the technology, which is newly introduced, such as diversity transmission.

Method 3

In this example, a method for transmitting enhanced-PHICH (E-PHICH) by using the DCI format will be described. This method may be understood that the E-PHICH structure is designed based on the DCI format/PDCCH. For convenience, the DCI format for E-PHICH transmission will be referred to as a DCI format X. The DCI format X may be a DCI format, which is newly defined, or a DCI format modified from the existing DCI format. In this case, the E-PHICH means a PHICH configured in the data region, and may mean a PHICH configured in the control region in accordance with definition. According to this example, the E-PDCCH structure which is designed previously may be reused instead of defining a separate channel structure for the E-PHICH. In particular, considering that the E-PDCCH and the E-PHICH are configured in the data region, their structures may be unified, whereby complexity caused by processing of control information may be reduced, and it may be advantageous in obtaining resources for PDSCH transmission and providing scheduling flexibility. In this example, the E-PHICH may be used together with the DCI format X, and the procedure of receiving and processing the E-PDCCH signal may be applied to the E-PHICH signal. The method according to this example may equally/similarly be applied to even a case where the (E-)PHICH is transmitted through the control region (for example, L-PDCCH).

In more detail, the user equipment may monitor the TM-dependent DCI format (and/or DCI format 1A/0) and the DCI format X, and may take different actions in accordance with the detected DCI format. In other words, if the TM-dependent DCI format (and/or DCI format 1A/0) is detected, the user equipment may obtain PDCCH information from the detected TM-dependent DCI format. If the DCI format X is detected, the user equipment may obtain E-PHICH information from the detected DCI format X. The TM-dependent DCI format (and/or DCI format 1A/0) may be identified from the DCI format X by using RNTI masked with CRC. For example, CRC of the TM-dependent DCI format (and/or DCI format 1A/0) may be masked using the existing RNTI (Table 3) (for example, C-RNTI), and CRC of the DCI format X may be masked using RNTI for the E-PHICH. Meanwhile, the E-PHICH may be designed to include PHICH of a plurality of user equipments (for example, user equipment group) as well as PHICH (that is, HARQ A/N information) of a specific user equipment. To this end, the DCI format X may be masked using group-RNTI for the E-PHICH, and may include HARQ A/N information of a plurality of user equipments. In this case, the HARQ A/N information within the group and the relation between the user equipments within the group may be configured in various manners.

Since the E-PHICH (that is, DCI format X) is generated based on (group-) RNTI for the E-PHICH and the DCI format 1A/0 is generated based on C-RNTI, if their lengths are designed equally, the DCI format X and the DCI format 1A/0 may be detected by decoding of one time. In more detail, CRC check may be performed for the result value of decoding by using (group-) RNTI for the E-PHICH and C-RNTI, whereby the DCI format X may be identified from the DCI format 1A/0. The DCI format 1A may additionally be identified from the DCI format 0 by using the flag field illustrated in Table 4. Accordingly, additional decoding complexity for the E-PHICH (DCI format X) is not required. Although additional complexity may exist in the process for CRC check, such additional complexity is small as negligible.

The E-PHICH may be designed using one RNTI or a plurality of RNTIs. In this case, RNTI for the E-PHICH may be designated previously by signaling, or may be associated with uplink transmission. For example, RNTI for the E-PHICH may dynamically be allocated in association with RB index (if a plurality of RBs are allocated, specific (for example, first)

RB index, DM RS cyclic shift (CS)) scheduled for uplink transmission. Also, if the DCI format X includes HARQ A/N information on a plurality of user equipments, information related to uplink transmission may be used by the corresponding user equipment to identify the location of HARQ A/N of the corresponding user equipment within the DCI format.

FIG. 15 is a diagram illustrating a method for receiving and processing control information in accordance with the embodiment of the present invention. Although FIG. 15 is illustrated in view of the user equipment, it will be apparent that a counteraction operation is performed by the base station.

Referring to FIG. 15, the user equipment receives a subframe that includes a PDCCH search space (S1502), and monitors the PDCCH search space to detect a PDCCH directed thereto (S1504). In this case, monitoring includes blind decoding of PDCCH candidates within the PDCCH search space. The PDCCH candidates are subjected to blind decoding on the assumption that the PDCCH candidates carry a specific DCI format according to the transmission mode. If the PDCCH is detected, the user equipment may analyze DCI of the PDCCH (S1506), and may perform the operation based on the analyzed DCI. In this case, the DCI may be analyzed to have A/N information or DL/UL grant information in accordance with masking information (for example, RNTI masked in CRC). For example, if CRC is masked with RNTI for the E-PHICH, the DCI may be analyzed to have HARQ A/N. On the other hand, if CRC is masked with C-RNTI, the DCI may be analyzed to have DL/UL grant information.

Method 4

The user equipment may receive the PDCCH, and may be configured to receive the E-PDCCH together with the PDCCH. To this end, a subframe (for example, subframe to which a synchronization channel is transmitted, and subframe to which a broadcast channel is transmitted) to which L-PDCCH is transmitted and a subframe to which the E-PDCCH is transmitted may be designated (in accordance with a channel status). The subframe for the L-PDCCH and the subframe for the E-PDCCH may previously be defined, may be identified indirectly in accordance with system configuration information, or may be designated through subframe allocation information. The subframe for E-PDCCH transmission and the subframe for L-PDCCH transmission may be set independently. The subframe for E-PDCCH transmission and the subframe for L-PDCCH transmission may be overlapped with each other. Also, in order to maintain blind decoding complexity at a proper level, the subframe for E-PDCCH transmission and the subframe for L-PDCCH transmission may be set so as not to be overlapped with each other.

In this example, the E-PDCCH is used to transmit control information (for example, scheduling information for PDSCH and PUSCH) of the related art, and the L-PDCCH may be used to transmit system related important parameter (for example, broadcast information). Also, the E-PDCCH may be used for transmission of the TM-dependent DCI format, and the L-PDCCH may be used for transmission of the DCI format 1A if fallback operation should be performed due to diversity transmission or unstable link. In this regard, in the LTE(-A) system of the related art, the DCI format 1A for fallback is located in the CSS. Accordingly, this method may be understood that USS only exists in the E-PDCCH and CSS exists in the L-PDCCH. In other words, the user equipment may try to perform blind decoding for the USS in the E-PDCCH region in case of the subframe for E-PDCCH transmission, and may try to perform blind decoding for the CSS or the CSS/USS in the L-PDCCH region in case of the subframe for L-PDCCH transmission.

FIG. 16 is a diagram illustrating a method for receiving and processing control information in accordance with the embodiment of the present invention. Although FIG. 16 is illustrated in view of the user equipment, it will be apparent that a counteraction operation is performed by the base station.

Referring to FIG. 16, the user equipment receives a subframe that includes a PDCCH search space (S1602), and monitors the PDCCH search space to detect a PDCCH directed thereto (S1604). In this case, monitoring includes blind decoding of PDCCH candidates within the PDCCH search space. The PDCCH candidates are subjected to blind decoding on the assumption that the PDCCH candidates carry a specific DCI format according to the transmission mode. If the PDCCH is detected, the user equipment may analyze DCI of the PDCCH (S1606), and may perform the operation based on the analyzed DCI. In this case, PDCCH search space monitoring is performed in the L-PDCCH search space or the E-PDCCH search space in accordance with subframe configuration. Subframe configuration may previously be defined, may be identified indirectly in accordance with system configuration information, or may be designated through subframe allocation information.

Figure 17:
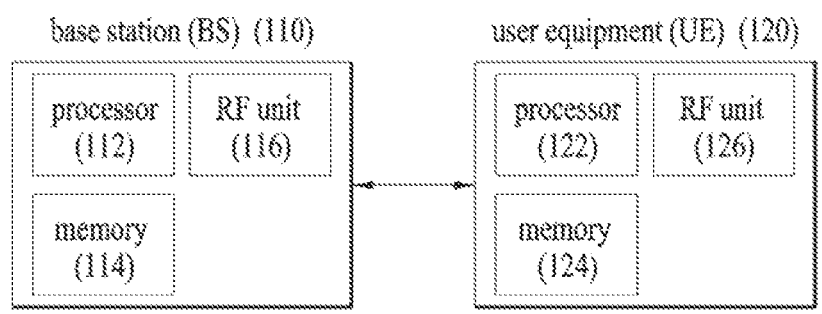
FIG. 17 is a diagram illustrating a base station and a user equipment, which may be applied to the present invention.

FIG. 17 is a diagram illustrating a base station, a relay and a user equipment, which can be applied to the present invention.

Referring to FIG. 17, the wireless communication system includes a base station (BS) 110 and a user equipment (UE) 120. If the wireless communication system includes a relay, the base station or the user equipment may be replaced with the relay.

The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the relay and the base station. This transmission and reception relation is equally/similarly applied to signal transmission and reception between the user equipment and the base station or between the user equipment and the relay. A specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention may be implemented by various means, for example, hardware, firmware, software, or their combination. If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention may be used for a user equipment, a base station or other equipment of the wireless mobile communication system. In more detail, the present invention may be applied to the method for efficiently transmitting and receiving control information and the device for the same.

The invention claimed is:

1. A method for receiving a physical downlink control channel (PDCCH) signal at a user equipment (UE) in a wireless communication system, the method comprising:
   receiving a signal on a subframe that includes a PDCCH search space;
   monitoring a plurality of PDCCH candidates in the PDCCH search space; and
   performing an operation according to a PDCCH signal if the PDCCH signal is detected,
   wherein if the subframe is a first type subframe, the PDCCH search space is configured in a first time region of the subframe,
   wherein if the subframe is a second type subframe, the PDCCH search space is configured in a second time region of the subframe,
   wherein the first time region and the second time region are multiplexed at the subframe by time division multiplexing (TDM), and
   wherein if the PDCCH signal carries a transmission mode (TM)-common downlink control information (DCI) format, at least part of the TM-common DCI format is analyzed differently depending on a time region where the PDCCH signal is detected.

2. The method according to claim 1, wherein the first time region includes first N number of orthogonal frequency division multiplexing (OFDM) symbols of the subframe, and the second time region includes OFDM symbols after the (N+1) th OFDM symbol at the subframe.

3. The method according to claim 1, wherein the PDCCH search space is only a UE-specific search space (USS) if the subframe is the second type subframe.

4. The method according to claim 1, wherein the first type subframe is a subframe for legacy-PDCCH (L-PDCCH) transmission, and the second type subframe is a subframe for enhanced-PDCCH (E-PDCCH) transmission.

5. The method according to claim 1, wherein when the subframe is a second type subframe, the TM-common DCI format includes information of a hybrid automatic repeat request-acknowledgement (HARQ-ACK) channel information.

6. A user equipment (UE) for use in a wireless communication system, the UE comprising:
   a radio frequency (RF) unit; and
   a processor,
   wherein the processor is configured to receive a signal on a subframe that includes a PDCCH search space, monitor a plurality of PDCCH candidates in the PDCCH search space, and perform an operation according to a PDCCH signal if the PDCCH signal is detected,
   wherein if the subframe is a first type subframe, the PDCCH search space is configured in a first time region of the subframe,
   wherein if the subframe is a second type subframe, the PDCCH search space is configured in a second time region of the subframe,
   wherein the first time region and the second time region are multiplexed at the subframe by time division multiplexing (TDM), and
   wherein if the PDCCH signal carries a transmission mode (TM)-common downlink control information (DCI) format, at least part of the TM-common DCI format is analyzed differently depending on a time region where the PDCCH signal is detected.

7. The UE according to claim 6, wherein the first time region includes first N number of orthogonal frequency division multiplexing (OFDM) symbols of the subframe, and the second time region includes OFDM symbols after the (N+1) th OFDM symbol at the subframe.

8. The UE user equipment according to claim 6, wherein the PDCCH search space is only a UE-specific search space (USS) if the subframe is the second type subframe.

9. The UE according to claim 6, wherein the first type subframe is a subframe for legacy-PDCCH (L-PDCCH) transmission, and the second type subframe is a subframe for enhanced-PDCCH (E-PDCCH) transmission.

10. The UE according to claim 6, wherein when the subframe is a second type subframe, the TM-common DCI format includes information of a hybrid automatic repeat request-acknowledgement (HARQ-ACK) channel information.

11. A method for transmitting a physical downlink control channel (PDCCH) signal by a base station in a wireless communication system, the method comprising:
  configuring a PDCCH search space; and
  transmitting a signal on a subframe that includes the PDCCH search space,
  wherein if the subframe is a first type subframe, the PDCCH search space is configured in a first time region of the subframe,
  wherein if the subframe is a second type subframe, the PDCCH search space is configured in a second time region of the subframe,
  wherein the first time region and the second time region are multiplexed at the subframe by time division multiplexing (TDM), and
  wherein if the PDCCH signal carries a transmission mode (TM)-common downlink control information (DCI) format, at least part of the TM-common DCI format is configured differently depending on a time region where the PDCCH signal is configured.

12. The method according to claim 11, wherein the first time region includes first N number of orthogonal frequency division multiplexing (OFDM) symbols of the subframe, and the second time region includes OFDM symbols after the (N+1)th OFDM symbol at the subframe.

13. The method according to claim 11, wherein the PDCCH search space is only a UE-specific search space (USS) if the subframe is the second type subframe.

14. The method according to claim 11, wherein the first type subframe is a subframe for legacy-PDCCH (L-PDCCH) transmission, and the second type subframe is a subframe for enhanced-PDCCH (E-PDCCH) transmission.

15. The method according to claim 11, wherein when the subframe is a second type subframe, the TM-common DCI format includes information of a hybrid automatic repeat request-acknowledgement (HARQ-ACK) channel information.

* * * * *